United States Patent Office 2,746,125
Patented May 22, 1956

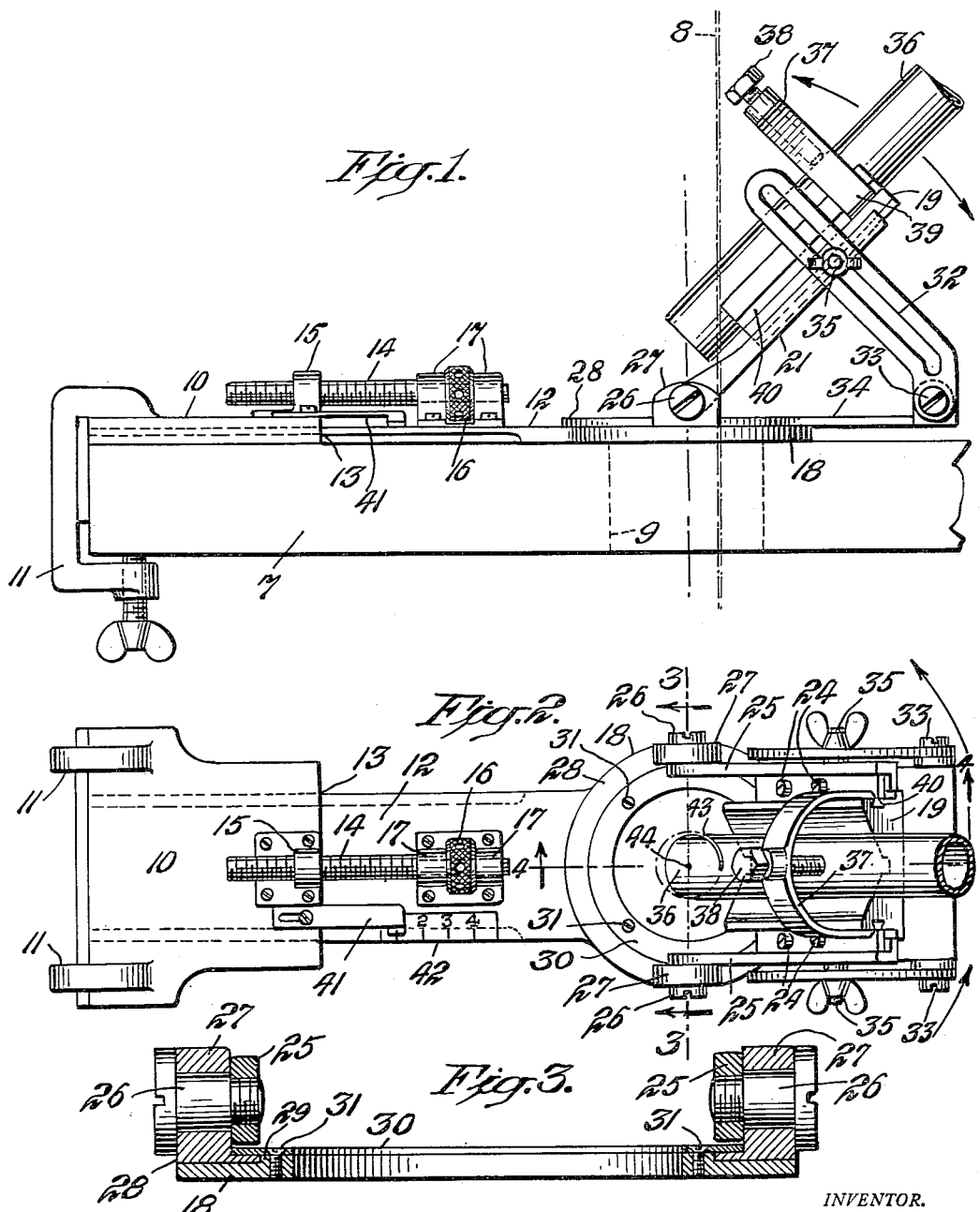

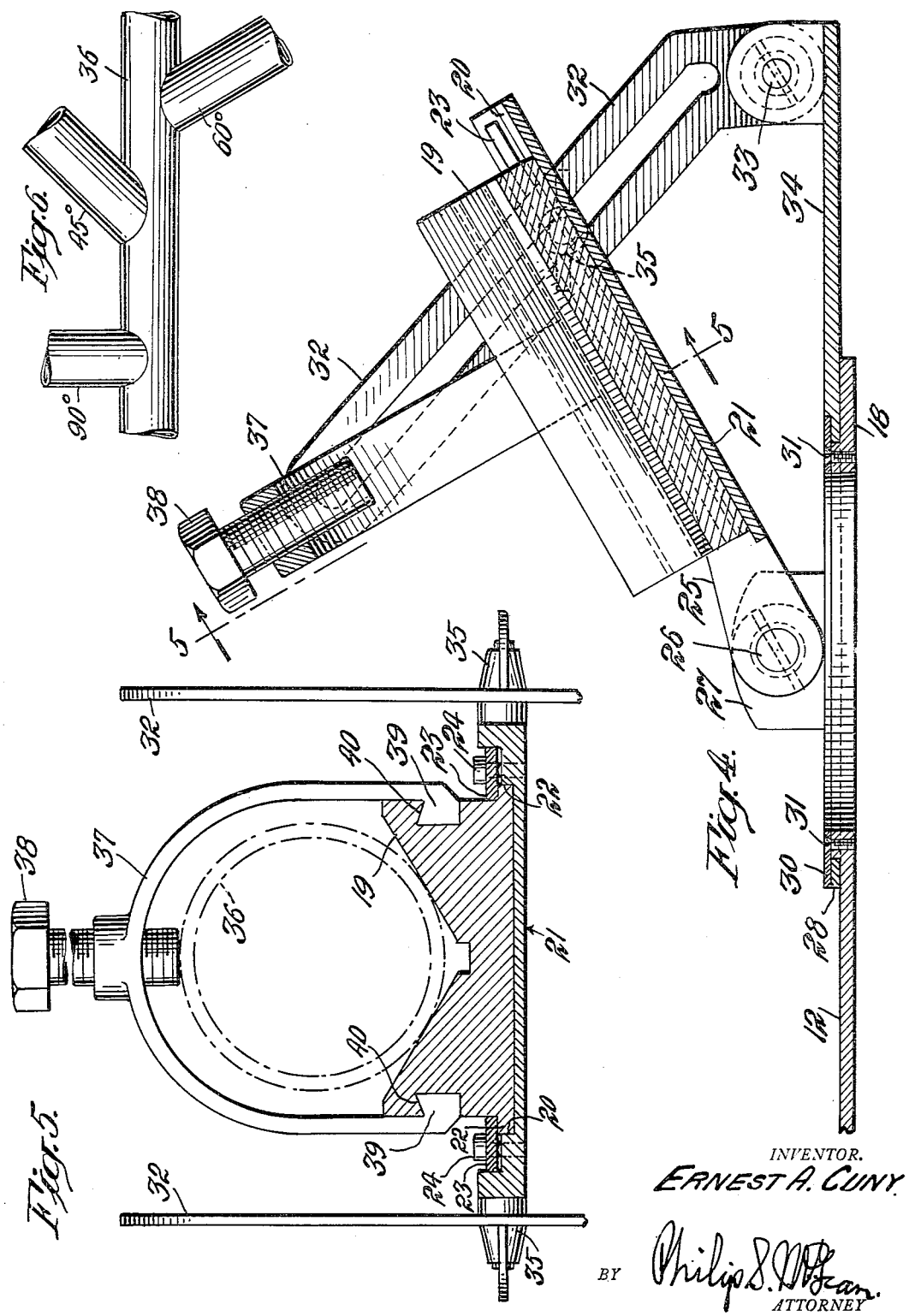

2,746,125

APPARATUS FOR CUTTING PIPE AT A PREDETERMINED RADIUS AND ANGLE

Ernest A. Cuny, Miami Beach, Fla.

Application May 18, 1953, Serial No. 355,820

4 Claims. (Cl. 29—67)

The invention herein disclosed relates to apparatus for cutting pipe at an angle and radius so as to fit and be welded at a desired inclination to another section of pipe.

Special objects of the invention are to provide such apparatus in a form which may be applied as an attachment to a bandsaw, utilizing the table of that machine as a support and the saw as the cutting tool.

Further special objects are to provide this attachment in a simple, practical form, readily attachable to the bandsaw, easy to adjust for desired angles and radius of cut, accurate in its operation and safe to use.

Other desirable objects and the novel features of invention through which the several purposes are attained, are set forth and will appear in the course of the following specification.

The drawings accompanying and forming part of the specification illustrate a present practical embodiment of the invention. Structure, however, may be modified and changed as regards the immediate illustration, all within the true intent and scope of the invention as hereinafter defined and claimed.

Fig. 1 in the drawings is a broken side elevation of a form of the invention applied to the table of a bandsaw and showing a section of pipe or tubing in relation to the saw, the latter indicated in broken lines;

Fig. 2 is a broken top plan view of the attachment showing the pipe cut by the saw, approximately half-way through;

Fig. 3 is an enlarged cross sectional view across the radius axis and the pivot center of the adjustable pipe rest, taken on substantially the plane of line 3—3 of Fig. 2;

Fig. 4 is a vertical sectional view of the rotatable and angularly adjustable pipe support, on substantially the plane of line 4—4 of Fig. 2;

Fig. 5 is a broken sectional view of the V-block pipe rest and clamp, on substantially the plane of line 5—5 of Fig. 4;

Fig. 6 is a broken side elevation illustrating pipe cut at angles to form different joints.

In Fig. 1 the bed or table of a bandsaw is indicated at 7 and the saw is indicated at 8, operating through a clearance opening 9 in the table.

While the apparatus of the present invention may be incorporated as a permanent part of the bandsaw, the embodiment shown is made up as an attachment which may be readily applied to any ordinary bandsaw, such as that indicated.

Accordingly, the device is made up with a base 10 to rest on the bandsaw table and be secured in fixed relation thereby by C-clamps 11 at the inner end of the base.

A slide 12 is extensibly connected with the base as by a dovetail or similar sliding connection therewith, at 13, this slide extending over the table to the saw and being adjusted in the present instance by a turn-screw 14 threaded in a seat 15 on the base and having an operating head 16 rotatable between bearings 17 on the slide.

At the outer end the slide 12 carries an open ring bearing 18, disposed about the saw and serving as a support for the rotatable and angularly adjustable pipe rest.

The pipe rest is shown as a V-block 19 slidable in a grooveway 20, Fig. 5, in a supporting plate 21 and having side flanges 22 at the base of the same held by overlying strips 23 secured by screws 24.

The plate 21 which carries the V-block is shown as having extended arms 25 at the lower or inner end of the same, receiving pivot screws 26 extended rotatably through bearing lugs 2 on diametrically opposite sides of the bearing ring 28.

This ring, as shown in Figs. 3 and 4, is rotatably supported on the ring extension 18 of the slide 12, held in centered relation thereon by engagement about an upstanding annular centering flange 29, and in which relation it is confined by an overstanding washer 30 secured by screws 31.

To secure the rest in different angular relations, longitudinally slotted links 32 are shown pivoted at their lower ends at 33 to a radial extension 34 of the carrier ring 28 and secured to opposite sides of the support 21 by thumb screws 35.

The pipe or tubing 36 is shown as adjustably held in the V-block, by an overstanding U-clamp 37 carrying a clamp screw 38 and having hooked ends 39, Fig. 5, caught in grooves 40 in the sides of the V-block.

The open ring form of pivotal support for the pipe rest provides ample clearance for the bandsaw operating through the same and for the angular as well as for the radial adjustments necessary to cut the pipe on different inclines and to different radius.

A suitable index and scale may be provided on the base and slide, such as indicated at 41, 42, Fig. 2, to aid in setting the machine for different radial cuts, and similar indexing means may be provided to assist in setting the rest for different angle cuts.

Figs. 1 and 2 show the carriage for the pipe set to effect a 45° angle cut and a radius the same as the pipe being cut. With outward adjustments of the slide to carry the center nearer the saw the radius will be reduced, and with inward adjustments of the slide to carry the ring center further away from the plane of the saw the radius will be increased.

These radius fixing adjustments may be made irrespective and independently of angular adjustments of the pipe holder and the latter may be set to effect cuts at different inclines irrespective of the radial adjustments.

After the machine has been set for proper radius and incline and the pipe has been properly secured in the V-block, the cut may be started by rotating the carriage to carry the side of the pipe into engagement with the cutting edge of the saw and then continuing the rotary motion, to complete the circular cut such as indicated at 43, Fig. 2.

A true circular cut at the desired angle and radius may be effected in a single smooth, continuous operation.

Fig. 6 illustrates various angle cuts such as may be effected on the machine. Pipe and tubing of metal, plastic or other materials may be rapidly and accurately cut at the desired angle and radius, ready for welding or otherwise securing, without requiring filing, smoothing or other treatment.

The V-block which forms the rest or cradle for the pipe automatically centers and holds the pipe on an axis coinciding with the axis 44 of rotatable adjustment of the carrier or support, and the axis of angular adjustment determined by the pivot screws 26 intersects this center, as shown in Fig. 2.

If desired, the pipe may be first firmly secured in the V-block by clamp 37 and then the block be slid up or down in its ways to locate it at the proper point for cutting, and then the screws 24 be tightened to secure and hold the block for accurate cutting of the pipe.

What is claimed is:

1. Machine for cutting pipe at an angle and at a radius to match the curvature of other pipe to which it is to be joined at that angle and comprising the combination of a pipe cutting tool operating on a vertical axis, a horizontally disposed open center bearing ring surrounding but clear of said cutting tool, a concentrically arranged open center clamp carrying ring swivelled on said bearing ring clear of the cutting tool and adjustable rotatably about the center of said bearing ring, a clamp for holding pipe axially aligned with the center of said bearing ring and pivotally supported on said clamp carrying ring on a horizontal axis intersecting the axis of the bearing ring to thereby present pipe to the cutting tool at an angle determined by adjustment of the same about said horizontal axis and means mounting the bearing ring for horizontal adjustment of the center of the same toward and away from the vertical axis of the cutting tool whereby to determine radius of cut made by said tool on rotation of said clamp carrying ring about the center of the bearing ring.

2. The invention according to claim 1, with said pipe clamp comprising a V-block arranged with its axis intersecting the axis of the bearing ring and mounted for longitudinal adjustment on its axis toward and away from said bearing ring axis.

3. The invention according to claim 1, with said mounting means for the bearing ring comprising a slide horizontally adjustable toward and away from the axis of the cutting tool.

4. Attachment for cutting pipe at different angles and radii on a bandsaw having a saw operating down through a clearance opening in a work supporting table and comprising a base having means for mounting the same on the table of a bandsaw at one side of the saw, a slide on said base adjustable over the table on a line toward and away from the saw, a horizontally disposed bearing ring carried by said slide and having an open center for clear passage of the saw in various positions of adjustment of the slide toward and away from the saw, an open center clamp carrying ring swivelled on said bearing ring and adjustable rotatably about the center of said bearing ring, a clamp for holding pipe axially aligned with the center of said bearing ring and pivotally supported on said clamp carrying ring on a horizontal axis intersecting the axis of the bearing ring to thereby present pipe to the saw at an angle determined by adjustment of the same about said horizontal axis.

References Cited in the file of this patent

UNITED STATES PATENTS

| | | |
|---|---|---|
| 405,310 | Harley | June 18, 1889 |
| 453,893 | Smith | June 9, 1891 |
| 707,675 | Colburn | Aug. 26, 1902 |
| 1,507,815 | Cumner | Sept. 9, 1924 |
| 1,879,211 | Hail | Sept. 27, 1932 |
| 2,085,321 | Lang | June 29, 1937 |